No. 774,039. PATENTED NOV. 1, 1904.
J. B. CARPENTER.
PRUNING IMPLEMENT.
APPLICATION FILED FEB. 20, 1904.
NO MODEL.
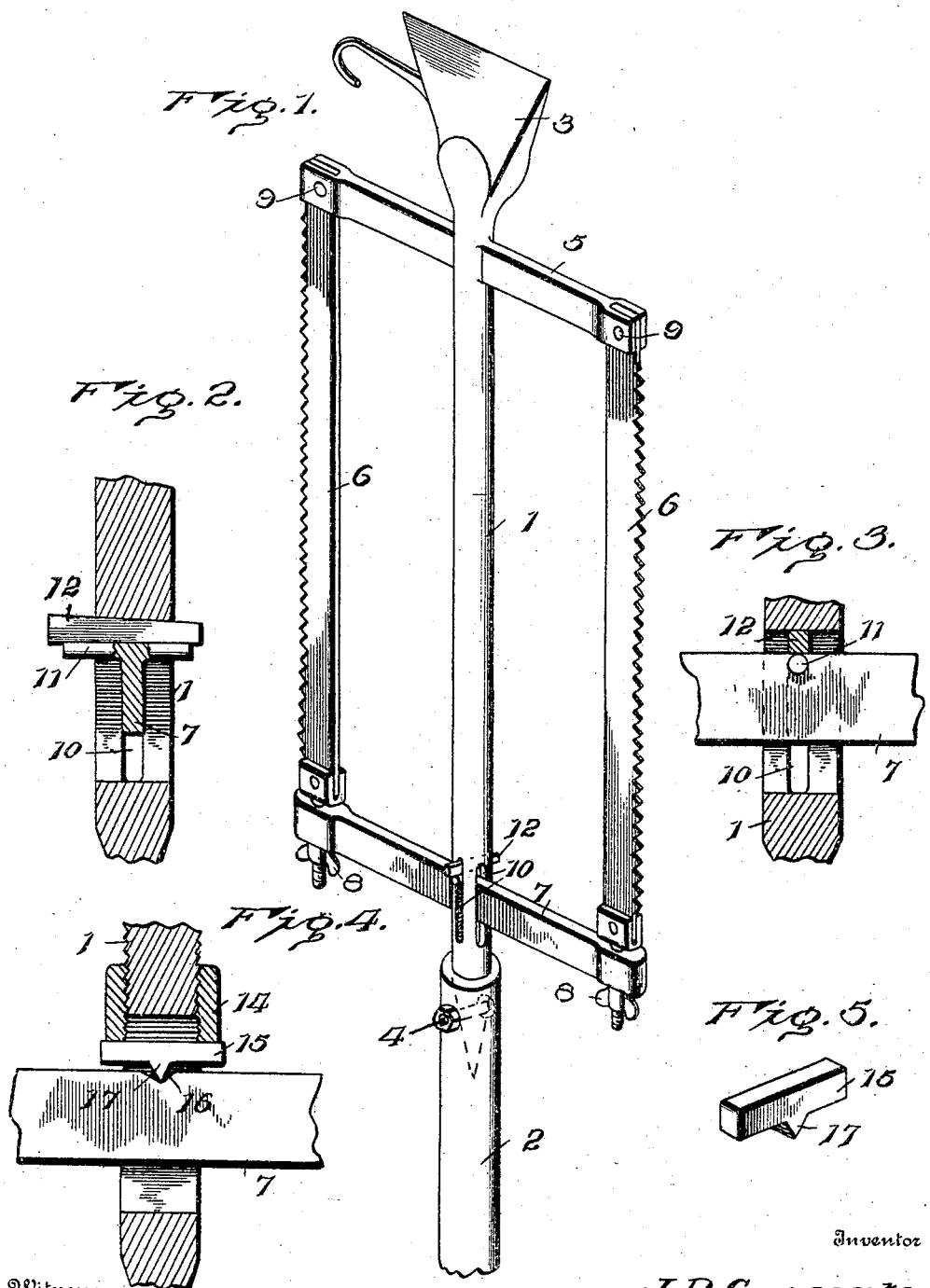
Witnesses
W. N. Woodson.
Emily H. England.
Inventor
J. B. Carpenter.
By R. S. & A. B. Lacey, Attorneys No. 774,039. Patented November 1, 1904.

UNITED STATES PATENT OFFICE.

JAMES B. CARPENTER, OF PLANTSVILLE, OHIO.

PRUNING IMPLEMENT.

SPECIFICATION forming part of Letters Patent No. 774,039, dated November 1, 1904.

Application filed February 20, 1904. Serial No. 194,540. (No model.)

*To all whom it may concern:*

Be it known that I, JAMES B. CARPENTER, a citizen of the United States, residing at Plantsville, in the county of Morgan and State of Ohio, have invented certain new and useful Improvements in Pruning Implements, of which the following is a specification.

This invention relates to new and novel improvements in that class of devices commonly called "pruning implements."

The invention particularly aims to provide an implement of this class combining in a single article means for engaging limbs preparatory to clipping or cutting them, cutting devices, and sawing devices.

For a full description of the invention and the merits thereof and also to acquire a knowledge of the details of construction of the means for effecting the result reference is to be had to the following description and accompanying drawings.

While the essential and characteristic features of the invention are susceptible of modification, still the preferred embodiment of the invention is illustrated in the accompanying drawings, in which—

Figure 1 is a perspective view showing an implement constructed in accordance with my invention. Fig. 2 is a sectional view through the shank of the implement, parts broken away to show more clearly the means for adjusting the movable saw-arm. Fig. 3 is another sectional view similar to Fig. 2, taken on a line about at right angle to that upon which Fig. 2 is taken. Fig. 4 is a detail view, parts broken away, embodying the modification. Fig. 5 is a detail perspective view of the fulcrumed block used in connection with the structure shown in Fig. 4.

Corresponding and like parts are referred to in the following description and indicated in all the views of the drawings by the same reference characters.

The invention comprises a shank 1, adapted to be attached at its lower end to a handle 2, the upper end of the shank being extended and provided with a knife-head 3. The shank is secured to the handle 2 by means of suitable detachable fastenings, such as 4, which admits of use of different sized handles to support the shank 1 under certain conditions of service. It will be obvious that in certain instances it is desirable to use a very long handle in pruning the uppermost limbs of the tree, whereas in other instances a short handle only is necessary for convenient manipulation of the implement. Adjacent the end of the shank which carries the knife-head 3 is disposed a transverse cross-bar 5, which extends laterally from opposite sides of the shank, as will be readily seen. The cross-bar 5 has attached to the end portions thereof the upper ends of the saws 6, the lower ends of the said saws being adjustably secured to the ends of a pivoted cross-bar 7, carried by the lower end portion of the shank 1. The saws 6 are attached to the pivoted cross-bar 7 by means of adjustable set-screws 8, preferably, the upper ends being pivotally secured to the rigid cross-bar 5, as shown at 9. The set-screws 8 admit of a certain amount of adjustment of the saws 6 in tightening and loosening same; but in order to secure a maximum adjustment of the saws the pivoted cross-bar 7 is adapted for a slidable movement relative to the shank 1. In order to admit of the slidable movement of the cross-bar 7, as before mentioned, the shank 1 is provided with angularly-disposed elongated openings 10. The cross-bar 7 extends through one of the elongated openings 10 of the shank, said cross-bar being provided with a pivot-pin 11, disposed laterally thereon and extended through the other of the angularly-disposed elongated openings 10. A wedge 12 is preferably used to coöperate with the pivoted cross-bar 7 to actuate the said bar in its slidable movement, said wedge being received by one of the openings 10 and bearing against the cross-bar 7 adjacent the pivot-pin 11 thereof. From the foregoing it will be noted that the saws 6 are adapted for a preliminary adjustment by means of the set-screws 8, and that further and simultaneous adjustment may be had when necessary through actuation of the wedge 12 and slidable movement of the cross-bar 7.

An engaging hook 13, having a knife-edge, is projected laterally from the knife-head 3, and this hook is adapted to engage limbs or the like preparatory to cutting same, as the case may be. The hook 13 is very conveniently located relative to the knife-head 3 and may be used to cut small branches and twigs.

In Fig. 4 is a somewhat modified construction of means for effecting the slidable movement of the cross-bar 7, as shown. In this form of the invention the shank 1 is threaded adjacent the openings 10 therein, and an adjustable collar 14 is mounted upon the threaded portion thereof. The collar 14 bears against a fulcrumed block 15, against which the cross-bar 7 obtains a pivotal bearing. The cross-bar 7 is provided with a recess 16, which receives the fulcrumed extension 17 of the block 15. Adjustment of the collar 14 actuates the cross-bar 17 and effects simultaneous adjustment of the saw 6.

It will be noted that the saw 6 may be readily detached when broken and others substituted therefor, and that these saws are adapted for a simultaneous or independent adjustment, as may be found most desirable.

Having thus described the invention, what is claimed as new is—

1. In a pruning implement, the combination with a shank provided at its upper end with a cutting-head, spaced cross-bars disposed upon the shank, saws having corresponding ends secured to the cross-bars aforesaid, and means for effecting independent or simultaneous adjustment of said saws.

2. In a pruning implement, the combination with a shank provided at its upper end with a cutting-head, a rigid cross-bar carried by the shank, a second cross-bar also carried by the shank and slidable with reference to the rigid cross-bar, saws connected at corresponding ends with the rigid and slidable cross-bars, and means for effecting slidable movement of the slidable cross-bar.

3. In a pruning implement, the combination with a shank having its upper end provided with a cutting-head, a rigid cross-bar carried by the shank adjacent the cutting-head aforesaid, a cross-bar disposed at the lower portion of the shank and slidable with reference to the rigid cross-bar, saws pivotally secured at corresponding ends to the rigid cross-bar and adjustably secured at their opposite ends to the movable cross-bars, and engaging means coöperating with the movable cross-bar to effect slidable adjustment thereof.

4. In a pruning implement, the combination with a shank provided at its upper end with a cutting-head, a hook projected laterally from the cutting-head, an upper rigid cross-bar, the shank being provided with an elongated opening adjacent its lower portion, a movable cross-bar pivotally and slidably supported in said opening, and saws connected at corresponding ends with the rigid and movable cross-bars.

In testimony whereof I affix my signature in presence of two witnesses.

JAMES B. CARPENTER. [L. S.]

Witnesses:
O. T. CLARK,
W. F. MINGUS.